(12) United States Patent
Tokuda et al.

(10) Patent No.: US 7,509,296 B2
(45) Date of Patent: Mar. 24, 2009

(54) INTERACTIVE LEARNING SYSTEM BASED ON TEMPLATE-TEMPLATE STRUCTURE

(75) Inventors: Naoyuki Tokuda, Tokyo (JP); Liang Chen, British Columbia (CA)

(73) Assignee: Sunflare Co., Ltd., Tokyo (JP)

( * ) Notice: Subject to any disclaimer, the term of this patent is extended or adjusted under 35 U.S.C. 154(b) by 197 days.

(21) Appl. No.: 10/550,090

(22) PCT Filed: Mar. 22, 2004

(86) PCT No.: PCT/JP2004/003838

§ 371 (c)(1),
(2), (4) Date: Dec. 21, 2005

(87) PCT Pub. No.: WO2004/084156

PCT Pub. Date: Sep. 30, 2004

(65) Prior Publication Data

US 2006/0154218 A1 Jul. 13, 2006

(30) Foreign Application Priority Data

Mar. 22, 2003 (JP) ............................. 2003-120733

(51) Int. Cl.
*G06F 17/00* (2006.01)
*G06N 5/00* (2006.01)
(52) U.S. Cl. ............................. 706/47; 706/46; 706/45
(58) Field of Classification Search .................. 706/47, 706/46, 45; 434/156, 169; 704/5, 2, 4
See application file for complete search history.

(56) References Cited

U.S. PATENT DOCUMENTS

2001/0044098 A1   11/2001   Johnson ...................... 434/323

FOREIGN PATENT DOCUMENTS

JP   2002049617   2/2002
JP   2003150584   5/2003

OTHER PUBLICATIONS

Tokuda et al., Naoyuki, "An Online Tutoring System for Language Translation", IEEE, 2001.*
Huang et al., Zhongping, "A Syntactical Approach to Diagnosing Multiple Bugs in an Intelligent Tutoring System", IEEE, 1996.*

(Continued)

*Primary Examiner*—David R Vincent
*Assistant Examiner*—Adrian L Kennedy
(74) *Attorney, Agent, or Firm*—Jacobson Holman PLLC (57) ABSTRACT

A learning system uses the concept of template automaton. "Various expected examples of learners" consisting of "correct" answers and "incorrect" answers are collected and a representative NLP technique such as HCS (heaviest common character string) or LCS (longest common character string) algorithm is used as an effective error diagnosis engine in the language learning system. These examples embedded in the template are used for diagnostic analysis of the answers of the learners. This diagnosis is performed by selecting a path of the highest similarity with the input sentence of the learner among a plenty of candidate paths. Thus, it is possible to automatize and simplify the time-requiring authoring task used in the language-oriented intelligent learning system.

13 Claims, 4 Drawing Sheets

OTHER PUBLICATIONS

Naoyuki Tokuda et al., "Template-Automaton—Based ILTS for Japanese-English Composition", The Institute of Electronics, Information and Communication Engineers, Ronbunshi, J84-D-I, vol. 7, Jul. 1, 2001, vol. J-84-D-I, No. 7, pp. 1089 to 1101, ISSN 0915-1915 (translation of abstract into English).

Naoyuki Tokuda et al., "Temple Automaton ni yoru On-line Chiteki Eisakubun Kyoiku Shien System", The Institute of Electronics, Information and Communication Engineers Ronbunshi, J84-D-I, vol. 7, Jul. 1, 2001, vol. J-84-D-I, No. 7 pp. 1089 to 1101, ISSN 0915-1915.

* cited by examiner

INTERACTIVE LEARNING SYSTEM BASED ON TEMPLATE-TEMPLATE STRUCTURE

This is a nationalization of PCT/JP04/003838 filed Mar. 22, 2004 and published in Japanese.

TECHNICAL FIELD

The present invention relates to a new dialogue learning system having a template-template structure based on extraction rules and exploiting the expanding power of buggy rules.

BACKGROUND ART

The invention is motivated by a keen need for automating and simplifying the time-consuming authoring task used for language-oriented intelligent learning systems. This is because even though the number of possible correct right responses is reasonably limited, it is often necessary to deal with a large, in fact, theoretically unlimited number of plausible errors of learners for developing an ideal learning system. As far as the inventors can judge, at least within the foreseeable future, the state of the art in natural language processing technology cannot reach the level capable of providing a ready solution to an automatic correction of an entirely free format error-ridden sentence. This seems possible only when the world knowledge base of so-called common sense may be introduced into the system so that many competent human teachers can somehow manage to cope with it.

DISCLOSURE OF THE INVENTION

A learning system according to the invention ("Azalea"), to which the concept of template automaton is introduced, collects many expected examples of a variety of learners, including "right" and "wrong" responses. As an efficient error diagnosis engine in the language learning system, the NLP technology of an HCS (heaviest common sequence) or an LCS (longest common sequence) algorithm plays a decisive role. Those examples embedded into the template are used for the diagnosis and analysis of learners' responses. The diagnosis is to be implemented by selecting a closest path from among a huge number of candidate paths in template databases to the learner's input sentences. The authoring task of building a template corpus consisting of well-formed model translations and ill-formed erroneous sentences is quite labor-intensive, taking up considerable time.

The new system of the invention not only simplifies or reduces the authoring task of template generation, which otherwise is time-consuming (refer to, JP-A No. 2002-49617 by Naoyuki Tokuda, Liang Chen, Hiroyuki Sasai, et al), but also is effective for the improvement of system performance. The first reason why the introduced template-template architecture can simplify the system and improve the performance is that the architecture makes it possible to integrate many different templates into a single template-template and vice versa, that is to extract many different templates therefrom by applying extracting rules assigned to some of the transition nodes of a single template. The second reason is that the introduced error rules have the function of automatically distinguishing and classifying erroneous learners' responses and, accordingly, generating errors therefrom. The importance of the NLP (natural language processing) techniques in the development of the system is obvious because a parser is used for examining the learner's structure free-format response and the semantic structure is examined by checking the learner's response in a character string against the semantically equivalent path of the provided template data base.

The template-template structure based on the new extracting rules or error rules is expected to play an important role in many applications, when used in any system selected from learning systems having character input and interaction means, voice-based call centers or voice-enabling portal systems, and any systems focusing on more enhanced human computer interfaces implementing more natural human-computer interactions between the system and humans.

The present invention provides the following three contributions:

1. Embedding extracting rules into certain nodes of the template-template transitional diagram with certain constraints imposed in selecting the nodes enables a single template-template to represent a variety of different types of existing templates.
2. By exploiting the expanding power of the error rules introduced, many erroneous expressions and/or many erroneous syntactic structures can now be described automatically with consistency so that the new template-template can be expanded into a fuller, more comprehensive template-template form, because of its automatic capability of describing the error taxonomy. The language teacher need not be concerned with the details of classifying erroneous translations at the time of authoring the template-template, thus bearing a reduced burden of error taxonomy, when evaluating and clustering the characteristics of the particular errors of learners.
3. The HCS matching algorithm can be developed so that the algorithm matches the input sentence against the simpler template-template directly, thus reducing the spatial and temporal calculation load in matching processes to find the best matched paths from among all the possible paths of all the extracted templates without actually expanding the template-template.

BEST MODE FOR PRACTICING THE INVENTION

Template-Template Structure

First the term "template-template" will be defined below. The template-template is defined as a special template where some of the nodes are marked with extracting rule-associated symbols allowing the template-template to be expanded into many templates, or a so-called "larger" template if a set of non-connected templates are regarded as one template. Such a set of disconnected templates allows a variety of possible translations of a single L1 sentence to form a single large template-template comprising a group of translated L2 sentences. Being an extended template, the template-template scheme allows one or more templates to be extracted from the template-template.

Typically, an extracting rule is always associated with a set of symbols, say $\{s_1, s_2, \ldots, s_n\}$, and each of the symbols is assigned one or more nodes in the templates. These associated symbols are assigned with one or more values whose function is to represent the style of the nodes that will appear in a template or templates extracted from the template-template. These symbols are herein referred to as "label symbols." The symbols related to a single rule are called "related symbols." Related symbols should have certain restrictions. As a typical restriction, for a given $s_{i=1}$, $s_k$ must often be restricted to 2, or to some positive integer other than 1. If the value of $s_i$ depends on the values assigned to a set of the other symbols, the choice of the value of $s_i$ is called a required choice of the other symbols.

Some examples of the extracting rules are given below so that language teachers can easily understand.

Type A Rule AP (appear)—NAP (not appear) Rule

Suppose that some nodes are marked with APi, while some other nodes are marked with NAPi (i being any integer, representing different Type A Rules). The AP-NAP Rule of Type A Rule imposes the condition that when expanded, a new expanded template can include either the nodes marked with $AP_i$ or the nodes marked with $NAP_i$, but not both of them at the same time. "$AP_i=0$" is used to denote the case where the nodes marked with $AP_i$ do not appear in a template. At this time, $NAP_i$ have to be 1, meaning that the nodes marked with $NAP_i$ will appear in the template. Thus, it can be seen that $NAP_i=1$ is the required choice of $AP_i=0$. By the same reasoning, when $NAP_i=0$, $AP_i$ must have a value of 1, so that $NAP_i=0$ is the required choice of $AP_i=1$.

Type B Rule PPR (Personal Pronoun)—PPRP (Personal Pronoun Possessive) Rule

As in the Type A Rule, the Type B rule imposes the condition that the nodes marked with $PPRP_i$ and the other nodes marked with $PPRP_i$ (i being any integer) appearing in a set of templates must respectively take on the form of the personal pronoun and the personal pronoun possessive form of the pronouns, as required by the natural language grammar of the pronouns. Given $PPRP_i$ (or $PPR_i$), the required values of $PPR_i$ (or $PPRP_i$) must be defined by the natural language grammar of pronouns.

Type C Rule AN (Arbitrary Number) Rule.

Type C Rule imposes the condition that any positive real number can be assigned to the nodes marked by $AN_i$. If it is true that "I have 5 books on Zen," this Rule $AN_i$ can be assigned to the error node of 5, because any number other than 5 is erroneous.

Type D Rule CHO (Choosing-one) Rules.

A Type D Rule imposes the condition that among all the nodes of the template-template marked by $CHOi_1$, $CHOi_2$, . . . , $CHOi_k$, one and only one set of nodes can appear in any of the templates extracted from the template-template. Here a different i represents a different Type D Rule. Hence, $CHOi_j=0$ implies that the nodes marked by $CHOi_j$ do not appear, while $CHOi_j=1$ implies that the specified nodes now appear. Obviously, if 1 is assigned to one $CHOi_k$, then 0 should be assigned to all the other $CHOi_j$.

The Error Rules for Expanding Template-Template

An error rule here is defined as a production rule of, or a rule for producing, common syntactically erroneous expressions which are characterized by possible deviations from syntactically correct expressions.

To be specific, consider the following form of an error rule:

$$H_1H_2 \ldots H_N \rightarrow R_1R_2 \ldots R_M$$

where $H_1H_2 \ldots H_N$ represents a set of nodes tracking the syntactically correct path of any template-templates, or a set of grammatical part-of-speech tags representing basic components or segments of a correct expression. $R_1R_2 \ldots R_M$ is the set of nodes which represents a typical erroneous expression whose correct form is $H_1H_2 \ldots H_N$. It is immediately seen that errors are identified by deviations from the correct paths of the template-template. Here is an example:

EX VBP→EX VBZ (Here EX represents existential such as "there is,"; VBP, verb for 1st and 2nd person present; VBZ, verb, 3rd person singular present). This example implies that a syntactically correct expression "there are 5 books" is used erroneously by students who misunderstood the subject-verb alignment, resulting in an erroneous expression of "there is 5 books" in this example.

DESCRIPTION OF SYMBOLS

Error Messages:
AS: an assumption has been made on the quantity of the noun
AT: the article is not needed
CM: a comma is needed
CT: contraction is incorrect
MN: meaning is incorrect
NP: noun must be plural
VS: verb must be singular, since subject is singular
PR: preposition is incorrect
PP: phrase must be plural Typical Part-of-Speech Tags:

| DT | Determiner | EX | Existential |
|---|---|---|---|
| IN | Preposition/Subord. conjunction | JJ | Adjective |
| NN | Noun, singular or mass | NNS | Noun, plural |
| NNP | Proper noun, singular | RB | Adverb |
| VBN | Verb, past particle | VBP | Verb, non-3rd ps. sing. Present |
| VBZ | Verb, 3rd ps. sing. Present | | |

The invention will be described in the following embodiment with reference to drawings.

Figure 1:
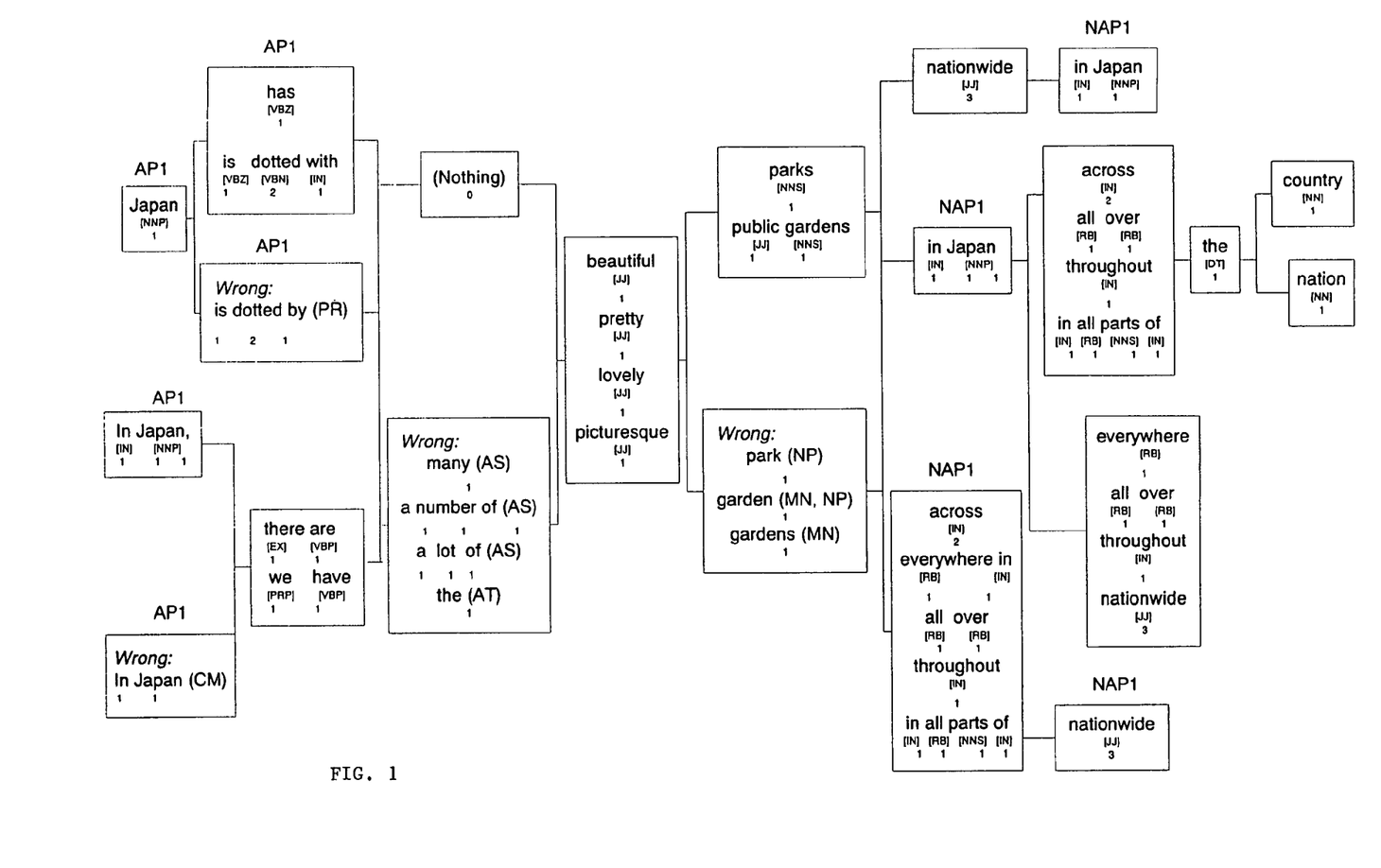
FIG. 1 is a diagram showing a template-template structure.
Figure 2:
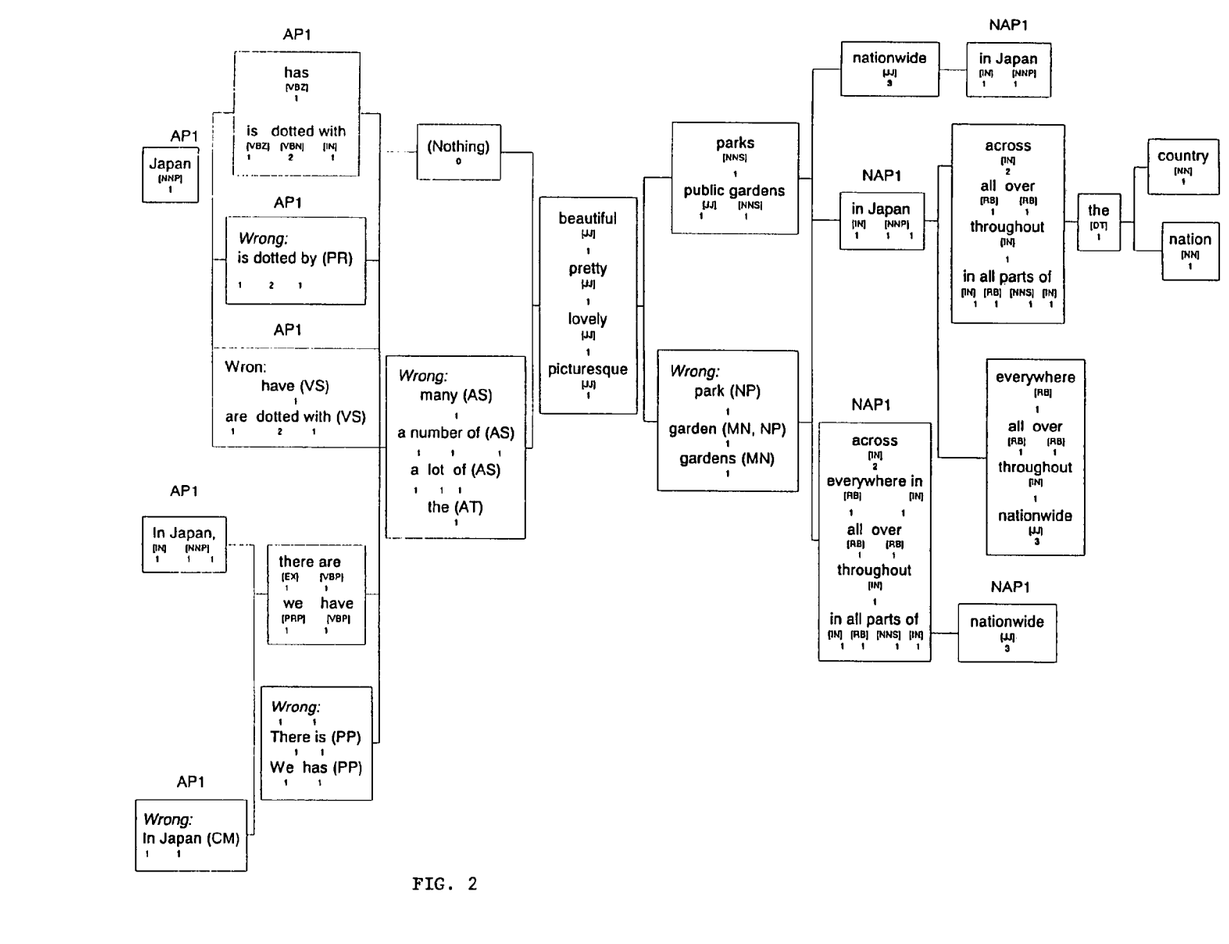
FIG. 2 is a diagram showing a template-template structure expanded by expansion rules.
Figure 3:
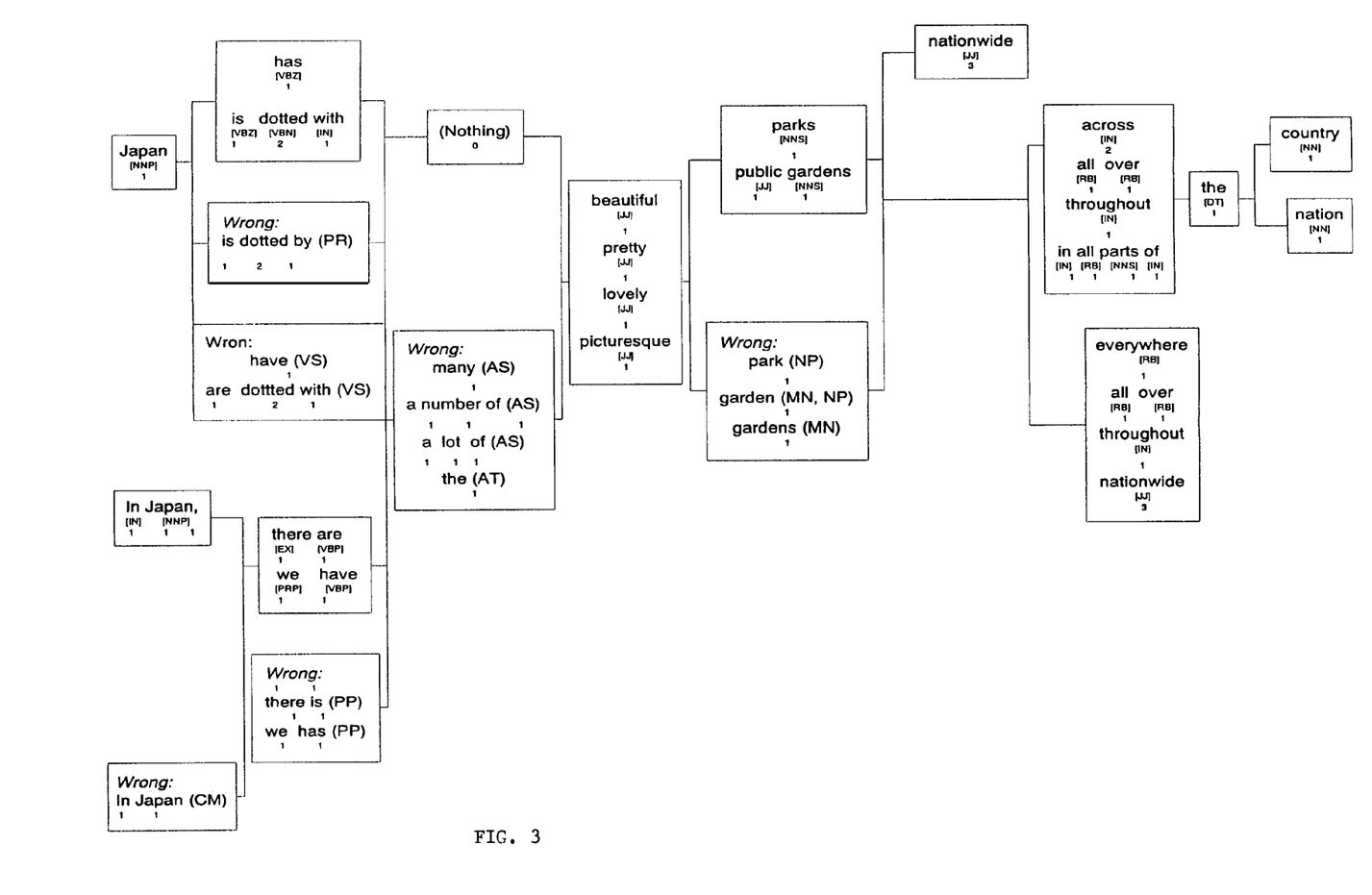
FIG. 3 is a diagram showing a template 1 expanded for a sentence meaning "Japan is dotted with beautiful gardens nationwide".
Figure 4:
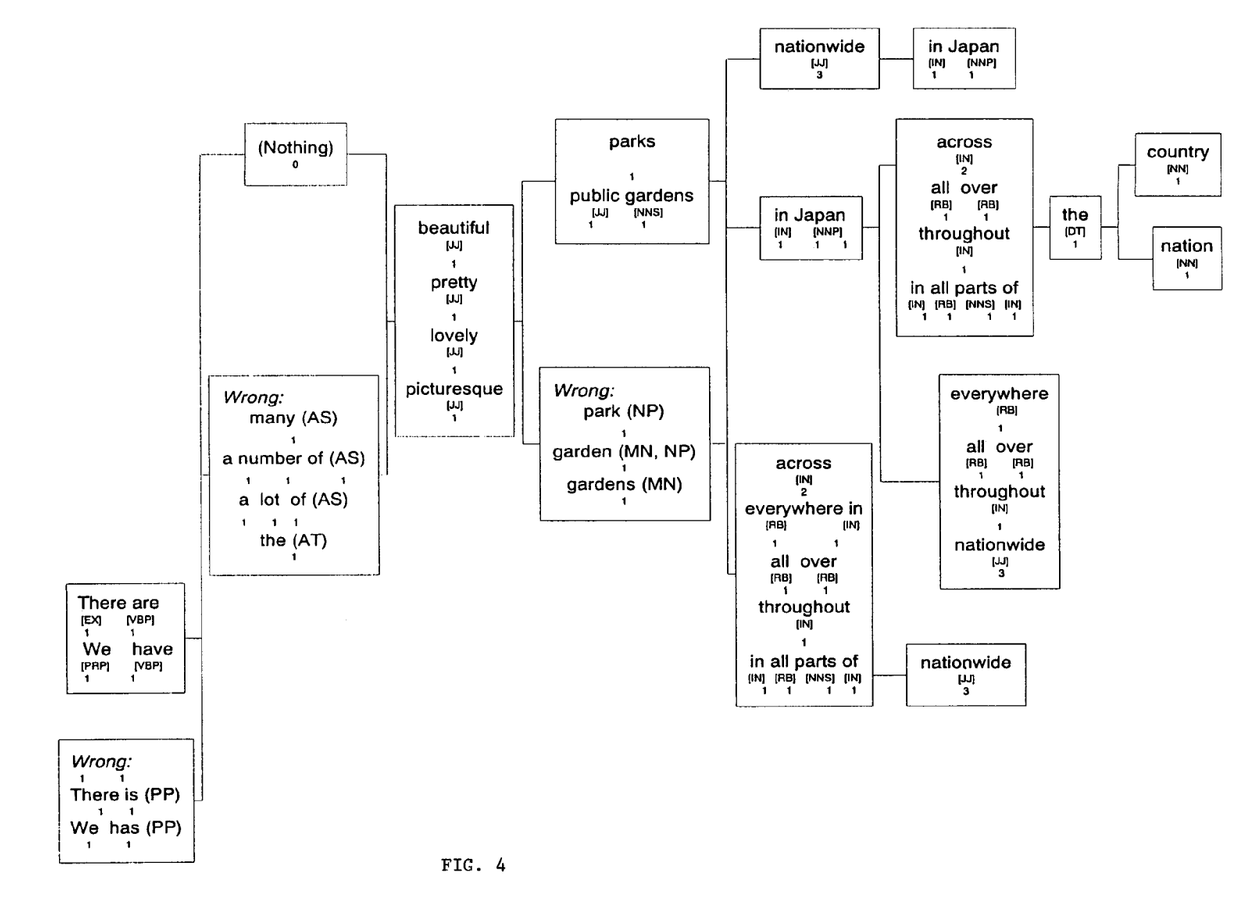
FIG. 4 is a diagram showing a template 2 expanded for a sentence meaning "Japan is dotted with beautiful gardens nationwide".

FIG. 1 is a diagram showing a template-template structure; FIG. 2 is a diagram showing a template-template structure expanded by the expansion rules; FIG. 3 is a diagram showing a template 1; and FIG. 4 is a diagram showing a template 2.

Example of Template-Template, Template-Template Expanded by Error Rules, and Templates Extracted from Template-Template In the embodiment of the invention, a template-template for English translations of a Japanese sentence meaning "Japan is dotted with beautiful gardens nationwide." is constructed at first. The numerals shown in FIG. 1 and other figures represent the weights of the respective words for enhancing the relative importance of the respective words in the sentence. The default weights of the words in the template are set to 1, and they must be assigned in accordance with the importance of the words as judged by experts in the field. Reference is made to JP-ANo. 2002-49617 by Naoyuki Tokuda, Liang Chen and Hiroyuki Sasai, for a detailed explanation. The symbols within "[" and "]" are the part-of-speech tags. The nodes shown in the left edge are starting nodes.

Now by simply applying the error rules listed above, the template-template of FIG. 1 can be expanded into the template-template of FIG. 2.

This shows that a language teacher need not be concerned with the details of classifying many common errors when he/she is constructing the template-template, since the error rules can generate taxonomization of errors, automatically allowing these erroneous expressions to be built into the template-template.

Now, by applying the Type A rule, it is easy to see that it is possible to extract a template as shown in FIG. 3 from the template-template of FIG. 2 by allowing the nodes marked with $AP_1$ to appear in the template and accordingly by deleting the nodes marked by $NAP_1$ of FIG. 2. Similarly, it is possible to extract the template as shown in FIG. 4, this time by deleting the nodes marked by $AP_1$ of FIG. 2, and accordingly letting the nodes marked with $NAP_1$ in FIG. 2 appear in the template.

It can be seen that a language teacher is able to construct the template-template, integrating a large combination of templates in terms of simpler label symbols.

Matching Algorithm for Template-Template and the Heaviest Common Sequence for an Input Sentence As is evident from the above discussion, many templates can be extracted from a single template-template. Suppose a template-template has label symbols $s_1, s_2, \ldots, s_n$ to be associated with certain nodes of the transitional diagram; it is seen that the different templates extracted from the template-template can be obtained by assigning these symbols to nodes. In the invention, it is possible to denote each template extracted from the template by an n-tuple $\{s_1, p_1, s_2, p_2 \ldots, s_n, p_n\}$, where $p_i$'s are proper assignment to symbols $s_i$. As has been discussed in an earlier section, $p_i$'s can be either numbers or words in accordance with the extracting rules used.

A heaviest common sequence of two sentences is defined as an ordered sequence of words, $a_1, a_2, \ldots, a_m$ which appear in both of the sentences in an order of $a_1$ then $a_2$ then ... then $a_m$. The definition of common sequence can be found in the book "*Foundations of Computer Science*" by A. V. Aho and J. D. Ullman (Computer Science Press, 1992, pp. 321-327)

As each word or phrase in the template is assigned with weights, the heaviest common sequence of a path in the template and an input sentence is defined as the common sequence among all the possible common sequences whose total weights are the largest.

A heaviest common sequence in words and/or phrases of an input sentence is searched for from among all the possible valid paths of the template.

The heaviest common sequence of a template and an input sentence is defined as the heaviest common sequence of words which has the heaviest total weight among the heaviest common sequences, each of which is obtained from one path of the template and the input sentence.

Once the template-template has been obtained in an application involving a language translation learning system, the next step is to match an input sentence to each of all the possible templates, and then choose the closest path. A detailed description on the DP(dynamic programming)-based matching procedure of a template to a sentence can be found in JP-A No. 2002-49617 by Naoyuki Tokuda, Liang Chen and Hiroyuki Sasai.

In the method of the present invention, a closest path is found from among all the valid paths of the templates that could be extracted from template-template with extracting rules (but without error rules) directly, and without physically extracting all the templates from the template-template. It is necessary to expand the error rules-embedded template-template first so that the template-template does not include any error rules before such a matching takes place. This can be performed in the steps of FIG. 2 described above.

The first step needed in the algorithm is to convert a template-template into its dual figure of an acyclic weighted finite digraph (directed graph), by simply expressing each node of the template as one or several arcs in the graph, by adding arcs labeled with 0 weight for each empty node where applicable. Since the digraph is converted from the template-template, it contains many arcs associated with label symbols whose functions depend critically on the values assigned to the symbols. Accordingly given one such digraph, a completely different template can be extracted if a different set of label symbols are assigned to arcs. That is to say, given such a digraph, it is possible to obtain many digraphs, each of which corresponds to a template that can be extracted from the template-template. The digraph extracted from template-template is hereinafter called a template-digraph.

The inventors now define a procedure of finding the heaviest common sequences from among the common sequences of the paths of all the digraphs and an input sentence as below.

The heaviest common sequence of the paths ended by any special node N in a digraph and an input sentence is defined as the sequence of words which has the heaviest total weight among all the heaviest common sequences, each of which is obtained from one path ended by N of the digraph and the input sentence.

Furthermore, let $N_i\{s_1,p_1,s_2,p_2, \ldots, s_n,p_n\}$ represent the paths of all the digraphs extracted from a template-digraph but ending at node $N_i$, where the symbol $s_i$ is assigned with value $p_i(i=1,2, \ldots, n)$. An n-tuple $\{s_1,p_1,s_2,p_2, \ldots, s_n,p_n\}$ is referred to as a label of node $N_i$. Here it should be assumed that there is no contradiction of the rules when $s_1$ is set as $p_1$, $s_2$ as $p_2, \ldots, s_n$ as $p_n$. Such a label $\{s_1,p_1,s_2,p_2, \ldots, s_n,p_n\}$ is reffered to as a contradiction-free label.

The heaviest common sequence of a node labeled $N_i\{s_1, p_1,s_2,p_2, \ldots, s_n,p_n\}$ and an input sentence is defined as the heaviest common sequence of words which has the heaviest total weight among all the heaviest common sequences, each of which is obtained as the heaviest common sequence of one digraph extracted from the digraph-template with the nodes marked with the contradiction-free label $\{s_1,p_1,s_2,p_2, \ldots, s_n,p_n\}$.

Note that some nodes can not appear simultaneously in one digraph extracted from a digraph-template, as in a node labeled AP2 and a node labeled NAP2 in one digraph. As the result, the rule breaking label such as $N_i( \ldots, AP2,1, \ldots, NAP2,1 \ldots )$ should not be allowed in any calculation scheme of the common sequences of a node in the digraph-template and an input sentence. The following algorithm describes the procedure for calculating the heaviest common sequence of a template-template and an input sentence. In the following, calculation, "λ" is used as a very special value of the label symbols, whereby its value remains unspecified up to a certain stage of the calculation.

1. Turn the template-template into a template-digraph of which the directed edges (transitions) are labeled by the corresponding words in the template;
2. Topologically sort all the nodes of the digraphs into $N_1, N_2, \ldots, N_t$, such that for each pair of nodes $N_i$ and $N_j$, there is no transition from $N_j$ to $N_i$, when j>i;
3. Add an empty node $N_0$ to the digraph, and add an arc from $N_0$ to all the starting nodes in the template-template.
4. Set $CM(N_0, M_0)=0$
5. For i=0 to t, do the following steps:
6. If there is at least one arc to $N_i$ which is associated with a symbol, and the s related labels would never exist after the node $N_i$, then for all i's, for j=0 to m, do the following:

Check all $CM(N_i\{ \ldots \}, M_j)$, for any label $\{s_1,p_1,s_2, p_2,\ldots,s_n,p_n\}$, if no s-related label appears in $\{s_1,s_2,\ldots,s_n\}$ and there exist at least an $\{s_1,p_1,s_2,p_2,\ldots,s_n,p_n, sx_1,px_1, sx_2,px_2,\ldots,sx_h,px_h\}$, where $sx_1, sx_2, \ldots, sx_h$ are s related labels, such that $CM(Ni\{s_1,p_1,s_2,p_2,\ldots,s_n,p_n, sx_1,px_1, sx_2, px_2,\ldots,sx_h,px_h\}, M_j)$ is defined. Define $CM(Ni\{s_1,p_1,s_2, p_2,\ldots,s_n,p_n\}, M_j)$ as the largest $CM(Ni\{s_1,p_1,s_2,p_2,\ldots,s_n,p_n, sx_1,px_1, sx_2,px_2, \ldots, sx_h,px_h\}, M_j)$, and un-define all the $CM(Ni\{s_1,p_1,s_2,p_2,\ldots,s_n,p_n, sx_1,px_1, sx_2,px_2, \ldots, sx_h,px_h\}, M_j)$ that had already been defined.

7. For j=0 to m, do the following steps:
8. For each of the nodes $N_k$ to which there is an arc from $N_i$, do the following:

(1) If arc $N_iN_k$ has no label, Check all the $CM(N_i\{ \ldots \}, M_j)$, $CM(N_i( \ldots ))))), M_{j+1})$, $CM(N_k\{ \ldots \}, M_j)$, $CM(N_k(\ldots), M_{j+1})$ that have been defined, define $CM(N_k\{s_1,p_1,s_2,p_2,\ldots,s_n,p_n\}, M_{j+1})$ as the maximum of the following data if one of
$CM(Ni\{s_1,p_1,s_2,p_2,\ldots,s_n,p_n\}, M_j)$, $CM(Ni\{s_1,p_1,s_2,p_2,\ldots, s_n,p_n\}, M_{j+1})$,
$CM(Nk\{s_1,p_1,s_2,p_2, \ldots ,s_n,p_n\}, M_j)$, $CM(Nk\{s_1,p_1,s_2, p_2,\ldots,s_n,p_n\}, M_{j+1})$ has already been defined:
$CM(N_i\{s_1,p_1,s_2,p_2, \ldots ,s_n,p_n\}, M_j)$ if it has already been defined
$M(N_i\{s_1,p_1,s_2,p_2,\ldots,s_n,p_n\}), M_j)+W(N_iN_k)$ if
$CM(N_i\{s_1,p_1,s_2,p_2,\ldots,s_n,p_n\}, M_j)$ had already been defined and the arc $N_iN_k$ is matched with $W_k$
$CM(Ni\{s_1,p_1,s_2,p_2,\ldots,s_n,p_n\}, M_{j+1})$ if it has already been defined
$CM(Nk\{s_1,p_1,s_2,p_2,\ldots,s_n,p_n\}, M_j)$, if it has already been defined
$CM(Nk\{s_1,p_1,s_2,p_2,\ldots,s_n,p_n\}, M_{j+1})$ if it has already been defined (2) If arc $N_iN_k$ is associated with symbol s, check all the $CM(N_i(\ldots), M_j)$, $CM(N_i\{\ldots\}, M_{j+1})$, $CM(N_k(\ldots), M_j)$, $CM(N_k\{\ldots\}, M_{j+1})$ that have been defined.
(i) If the node label $\{s_1,p_1,s_2,p_2,\ldots,s_n,p_n,s,\lambda\}$ is a contradiction-free label, and at least one of the following has already been defined:
$CM(N_i\{s_1,p_1,s_2,p_2,\ldots,s_n,p_n\}, M_j)$, $CM(N_i\{s_1,p_1,s_2,p_2,\ldots, s_n,p_n\}, M_{j+1})$,
$CM(N_k\{s_1,p_1,s_2,p_2,\ldots,s_n,p_n\}, M_j)$, $CM(N_k\{s_1,p_1,s_2,p_2,\ldots, s_n,p_n\}, M_{j+1})$,
$CM(N_i\{s_1,p_1,p_2,s_2,p_2,\ldots,s_n,p_n,s, \lambda\}, M_j)$, $CM(N_i\{s_1,p_1,s_2, p_2,\ldots,s_n,p_n,s,\lambda\}, M_{j+1})$,
$CM(N_k\{s_1,p_1,s_2,p_2,\ldots,s_n,p_n,s, \lambda\}, M_j)$, $CM(N_k\{s_1,p_1,s_2, p_2,\ldots,s_n,p_n,s,\lambda\}, M_{j+1})$;
Define $CM(N_k\{s_1,p_1,s_2,p_2,\ldots,s_n,p_n,s,\lambda\}, M_{j+1})$ as the maximum one of the above defined data.
(ii) Given label $\{s_1,p_1,s_2,p_2,\ldots,s_n,p_n\}$, suppose that the label $\{s_1,p_1,s_2,p_2, \ldots,s_n,p_n\}$ is a contradiction-free label, and that at least one of the following is true:

$CM(Ni\{s_1,p_1,s_2,p_2,\ldots,s_n,p_n\}, M_j)$ has been defined and, if setting s to p is a required choice of $\{s_1,p_1,s_2,p_2,\ldots,s_n,p_n\}$ or $N_iN_k$ is matched to $M_{j+1}$ after p is assigned to s.
$CM(Ni\{s_1,p_1,s_2,p_2,\ldots,s_n,p_n\}, M_{j+1})$, has been defined and if setting s to p is a required choice of $\{s_1,p_1,s_2,p_2,\ldots,s_np_n\}$
$CM(Nk\{s_1,p_1,s_2,p_2,\ldots,s_n,p_n\}, M_j)$, has been defined and if setting s to p is a required choice of $\{s_1,p_1,s_2,p_2,\ldots,s_n,p_n\}$
$CM(Nk\{s_1,p_1,s_2,p_2,\ldots,s_n,p_n,s,p\}, M_{j+1})$, has been defined
$CM(Ni\{s_1,p_1,s_2,p_2,\ldots,s_n,p_n,s,p,\}, M_j)$, has been defined
$CM(Ni\{s_1,p_1,s_2,p_2,\ldots,s_n,p_n,s,p\}, M_{j+1})$, has been defined
$CM(Nk\{s_1,p_1,s_2,p_2,\ldots,s_n,p_n,s,p\}, M_j)$, has been defined
$CM(Nk\{s_1,p_1,s_2,p_2,\ldots,s_n,p_n,s,p\}, M_{j+1})$ has been defined Define $CM(N_k\{s_1,p_1,s_2,p_2,\ldots,s_n,p_n,s,p\}, M_{j+1})$ as the maximum one from the above defined data and the following data
$CM(Ni\{s_1,p_1,s_2,p_2,\ldots,s_n,p_n\}, M_j)+W(M_{j+1})$ if
$CM(Ni\{s_1,p_1,s_2,p_2,\ldots,s_n,p_n\}, M_j)$ is defined and $N_iN_k$ is matched to $M_{j+1}$ after p is set to s.
$CM(Ni\{s_1,p_1,s_2,p_2,\ldots,s_n,p_n,s,p\}, M_j)+W(M_{j+1})$ if
$CM(Ni\{s_1,p_1,s_2,p_2,\ldots s_n,p_n,s,p\}, M_j)$ is defined and $N_iN_k$ is matched to $M_{j+1}$ after p is assigned to s And also change those $s_i$ from $\lambda$ to a required choice of the value, subject to the condition of p being assigned as s.

Among all the $CM(N_x, M_m)$ already defined with $N_x$ being a final vertex, the largest $CM(N_x, M_m)$ will be the weight of the heaviest common sequence of the template-template and the path.

Note that, in the above algorithm, whenever $CM(N.(\ldots), M.)$ is selected from several candidates a kind of back link is set to the selected one. Note that by tracing the back link it is possible to obtain the path of the extracted template which has the heaviest common sequence with the input sentence immediately, as having found the weight of the largest common sequence of the template-template and the path.

INDUSTRIAL APPLICABILITY

Although the invention has been described for the technical field of a natural language learning system, the application of the invention is not limited to natural language learning systems, and rather the invention is applicable to any of voice-enabling technology, a programming language learning system, and systems which need more natural advanced interfaces allowing human-computer interactions.

The invention claimed is:

1. A computer-implemented dialogue learning system for teaching a language which automatically generates from a correct expression of a sentence a plurality of incorrect expressions of the sentence, the system comprising:
a template-template that contains within itself a plurality of templates and a plurality of nodes marked with label symbols that are associated with extraction rules, said system including a plurality of error rules by which the template-template can be expanded by adding a plurality of incorrect expressions of the sentence thereto as defined by the error rules, said extraction rules extracting a template from said template-template by including, excluding or modifying certain nodes of said template-template based on a value of the label symbols marking said nodes, said extracted template including at least one correct expression of the sentence and a plurality of incorrect expressions of the sentence, said system, by automatically defining a plurality of common incorrect expressions of the sentence according to the error rules, providing for automatic diagnosis of grammatical errors committed by a learner, each of said extraction rules being associated with a set of said label symbols ($s_1, s_2, \ldots s_n$), with each symbol in said set being assigned one or more values, the values including at least one of an error message and a speech tag.

2. The computer-implemented system as set forth in claim 1, wherein each of said extraction rules is one of a plurality of rule types, with a first rule type providing that the symbol value of a particular node is either "appear" or "not appear", said system being configured to extract a template according to said first rule type by including in said extracted template either all the nodes having a symbol value of "appear" or all of the nodes having a symbol value of "not appear", but not both of these symbol values.

3. The computer-implemented system as set forth in claim 2, wherein said plurality of rule types further includes a second rule type providing that the symbol value of a particular node is either a personal pronoun or a personal pronoun possessive with each being defined by language grammar rules applicable to the language being learned.

4. The computer-implemented system as set forth in claim 3, wherein said plurality of rule types further includes a third rule type providing that the symbol value of a particular node is an arbitrary number.

5. The computer-implemented system as set forth in claim 4, wherein said plurality of rule types further includes a fourth rule type providing that for all nodes marked with the fourth rule type, only one of said fourth rule type nodes can appear in the extracted template.

6. An automated computer-implementable dialogue learning system for teaching a language which automatically generates from a correct expression of a sentence a plurality of possible incorrect expressions of the sentence, said system comprising:

a template-template that contains within itself a plurality of templates and a plurality of nodes marked with label symbols that are associated with extraction rules, said template-template including at least one correct expression of a sentence, said system including a plurality of error rules by which the template-template can be expanded to include at least one incorrect expression of said sentence, said extraction rules extracting a template from said template-template by including, excluding or modifying certain nodes of said template-template based on a value of the label symbols marking said nodes, said extracted template including at least one correct expression of the sentence and at least one incorrect expression of the sentence, said system, by automatically defining a plurality of common incorrect expressions of the sentence according to the error rules, providing for automatic diagnosis of grammatical errors committed by a learner, each of said extraction rules being associated with a set of said label symbols ($s_1$, $s_2$, ... $s_n$), with each symbol in said set being assigned one or more values, the values including at least one of an error message and a speech tag.

7. The automated computer-implementable system as set forth in claim 6, wherein each of said extraction rules is one of a plurality of rule types, with a first rule type providing that the symbol value of a particular node is either "appear" or "not appear", said system being configured to extract a template according to said first rule type by including in said extracted template either all the nodes having a symbol value of "appear" or all of the nodes having a symbol value of "not appear", but not both of these symbol values.

8. The automated computer-implementable system as set forth in claim 7, wherein said plurality of rule, types further includes a second rule type providing that the symbol value of a particular node is either a personal pronoun or a personal pronoun possessive with each being defined by language grammar rules applicable to the language being learned.

9. The automated computer-implementable system as set forth in claim 8, wherein said plurality of rule types further includes a third rule type providing that the symbol value of a particular node is an arbitrary number.

10. The automated computer-implementable system as set forth in claim 9, wherein said plurality of rule types further includes a fourth rule type providing that for all nodes marked with the fourth rule type, only one of said fourth rule type nodes can appear in the extracted template.

11. The automated computer-implementable system as set forth in claim 6, wherein a plurality of templates can be automatically generated from said template-template by said computer system based on the label symbols marking said nodes and the extraction rules applied thereto.

12. An automated computer-implementable dialogue learning system for teaching a language which automatically generates from a correct expression of a sentence a plurality of possible incorrect expressions of the sentence, said system comprising:

a template-template that contains within itself a plurality of templates and a plurality of nodes marked with label symbols that are associated with extraction rules, said template-template including at least one correct expression of a sentence, said system including a plurality of error rules by which the template-template can be expanded to include at least one incorrect expression of said sentence, said extraction rules extracting a template from said template-template by including, excluding or modifying certain nodes of said template-template based on a value of the label symbols marking said nodes, said extracted template including at least one correct expression of the sentence and at least one incorrect expression of the sentence, said system, by automatically defining a plurality of common incorrect expressions of the sentence according to the error rules, providing for automatic diagnosis of grammatical errors committed by a learner, said extracted template including a plurality of correct expressions of the sentence defined by a plurality of paths across the extracted template and a plurality of incorrect expressions of the sentence defined by a plurality of paths across the extracted template, said system using a heaviest common sequence algorithm to automatically determine an optimal path from said plurality of paths for said sentence.

13. The An automated computer-implementable dialogue learning system for teaching a language which automatically generates from a correct expression of a sentence a plurality of possible incorrect expressions of the sentence, said system comprising:

a template-template that contains within itself a plurality of templates and a plurality of nodes marked with label symbols that are associated with extraction rules, said template-template including at least one correct expression of a sentence, said system including a plurality of error rules by which the template-template can be expanded to include at least one incorrect expression of said sentence, said extraction rules extracting a template from said template-template by including, excluding or modifying certain nodes of said template-template based on a value of the label symbols marking said nodes, said extracted template including at least one correct expression of the sentence and at least one incorrect expression of the sentence, said system, by automatically defining a plurality of common incorrect expressions of the sentence according to the error rules, providing for automatic diagnosis of grammatical errors committed by a learner, said system being configured to select the heaviest common sequence based on dynamic programming on a plurality of possible paths that could be extracted from the template-template without actually extracting all of said possible paths from the template-template.

* * * * *